United States Patent
Qu et al.

(10) Patent No.: US 8,238,301 B2
(45) Date of Patent: Aug. 7, 2012

(54) METHOD, SYSTEM, AND WIRELESS FRAME STRUCTURE FOR SUPPORTING DIFFERENT MODE OF MULTIPLE ACCESS

(75) Inventors: Hongyun Qu, Shenzhen (CN); Sean Cai, San Diego, CA (US)

(73) Assignee: ZTE Corporation, Guangdong Province (CN)

( * ) Notice: Subject to any disclaimer, the term of this patent is extended or adjusted under 35 U.S.C. 154(b) by 354 days.

(21) Appl. No.: 12/594,325

(22) PCT Filed: Dec. 29, 2007

(86) PCT No.: PCT/CN2007/003896
§ 371 (c)(1),
(2), (4) Date: Oct. 1, 2009

(87) PCT Pub. No.: WO2008/119219
PCT Pub. Date: Oct. 9, 2008

(65) Prior Publication Data
US 2010/0135207 A1    Jun. 3, 2010

(30) Foreign Application Priority Data
Apr. 3, 2007  (CN) .......................... 2007 1 0073810

(51) Int. Cl.
*H04W 4/00*  (2009.01)
(52) U.S. Cl. ...................................... 370/329; 455/446

(58) Field of Classification Search ........................ None
See application file for complete search history.

(56) References Cited

U.S. PATENT DOCUMENTS

| | | | |
|---|---|---|---|
| 6,219,347 B1 * | 4/2001 | Uchida et al. | 370/347 |
| 6,532,364 B1 * | 3/2003 | Uchida et al. | 370/332 |
| 6,577,874 B1 | 6/2003 | Dailey | |
| 6,590,878 B1 * | 7/2003 | Uchida et al. | 370/330 |

FOREIGN PATENT DOCUMENTS

| | | |
|---|---|---|
| JP | 2005318196 | 10/2005 |
| WO | 2007005182 A2 | 1/2007 |

* cited by examiner

*Primary Examiner* — Anh-Vu Ly
(74) *Attorney, Agent, or Firm* — Jones, Walker, Waechter, Poitevent, Carrere & Denegre, L.L.P.

(57) ABSTRACT

A method, system, and wireless frame structure for supporting different modes of multiple radio access. The described system comprises base stations and terminals. There is a group of base stations at the same location, which include at least two synchronized base stations on the same frequency band, supporting different multiple access techniques in downlink or uplink. The base stations in the described group transmit downlink frames in a negotiated downlink zone and receive uplink frames in a negotiated uplink zone respectively, and the zones of the base stations are not overlapped. Each terminal accesses to one of the base stations according to the downlink multiple access technique that it supports, and receives/transmits signals in the downlink zone/uplink zone allocated to the base station.

7 Claims, 2 Drawing Sheets

METHOD, SYSTEM, AND WIRELESS FRAME STRUCTURE FOR SUPPORTING DIFFERENT MODE OF MULTIPLE ACCESS

TECHNICAL FIELD

The present invention relates to the field of wireless communication, and specifically, to a method, system, and wireless frame structure capable of supporting different multiple access modes simultaneously within a wireless communication system.

BACKGROUND OF THE INVENTION

There exists different multiple access modes, such as code division multiple access (CDMA), frequency division multiple access (FDMA) and time division multiple access (TDMA), in wireless communication system. With the development of wireless communication technologies, new modes of multiple access including space division multiple access (SDMA) and orthogonal frequency division multiple access (OFDMA), are emerging continuously.

Each multiple access mode has its own features. For example, FDMA technology divides the total bandwidth of a system into several non-overlapped sub-bands, each of which is allocated to a user. TDMA technology divides each channel into several time slots, each of which is allocated to a user. CDMA technology allocates to each user a pseudo random code with good auto-correlation and cross-correlation property. As such, multiple users can simultaneously send signal in the same bandwidth. TDMA and CDMA generally use FDMA to divide their frequency band into smaller frequency bands, and then perform time division operation or code division operation. SDMA utilizes space irrelevance to obtain multiple access capability.

As for these traditional modes of multiple access, since a base station and a terminal send signals with a single carrier frequency or on a narrow band, it is more suitable for supporting low-speed voice services. For high-speed data services, there is relatively severe inter-symbol interference in a single carrier frequency system or narrowband system, thus the requirement for the equalizer of receiver is higher. For those multiple access techniques that support conventional multi-carrier, they need to use filter banks to separate signals at the receiver side. This kind of multiple access techniques are comparatively simple to implement, however, they have the disadvantage of low spectrum efficiency.

OFDMA, which supports high-speed data service, divides a channel band into different sub-channels, and multiple users can simultaneously send signals on different sub-channels. An OFDMA system can effectively reduce inter-signal interference through serial-parallel conversion of high-speed data, thus to reduce the complexity of the receiver. Moreover, the OFDMA system utilizes orthogonality between the sub-carries to allow the spectrum of the sub-channels to overlap with each other, so that the usage of spectrum resource can be maximized. Compared with a single carrier system, however, the OFDMA system has relatively higher peak-to-average power ratio.

With the development of wireless communication technology, especially with the development of multiple access techniques, categories of the wireless terminals and services supported are also greatly enriched. In addition to all kinds of handheld terminals, fixed terminals as well as the application of notebook computers are also an important part. Basically, because of their size and cost, the handheld terminals require relatively small power consumption, thus traditional single-carrier multiple access techniques such as SC-FDMA (single carrier frequency division multiple access) may be applied to support low-speed voice service. The fixed terminals and notebook computers can use power supply or other stable power equipment, thus they are able to provide users with high-speed data service and as a result, the multiple access mode of OFDMA can be applied.

In the present wireless communication system, a base station can only support terminals with a single multiple access mode. For example, in a CDMA communication system, a base station only supports the terminals whose uplink and downlink both apply CDMA technology. In an IEEE (Institute of Electrical and Electronics Engineers) 802.16e system, a base station only supports the terminals whose uplink and downlink both apply OFDMA technology.

However, with the development of wireless communication technologies, for different modes of multiple access, there is an increasing need for a communication system that is capable of supporting different multiple access modes with the same carrier frequency.

SUMMARY OF THE INVENTION

The technical problem to be solved in the present invention is to provide a method, system, and wireless frame structure supporting different modes of multiple access, to support different modes of multiple access on the same carrier frequency.

In order to solve the technical problem above, it is provided in the present invention a system for supporting different modes of multiple access, comprising base stations and terminals, wherein a group of base stations are at the same location, and within the same group there are at least two synchronized base stations operating on the same frequency band, supporting different modes of multiple access in uplink or downlink, and wherein, Each base station in the same group is configured to send downlink signals in respective downlink zone within the system downlink frame and receive uplink signals in respective uplink zone within the system uplink frame, the uplink and downlink zones of different base stations are time divided and not overlapped with each other;

Said terminal is configured to access to one of the base stations according to the downlink multiple access technique that the terminal supports, and receive/send signals in the downlink/uplink zone allocated to the base station.

Further, the above system may have the following feature: the base stations in the same group are synchronized through GPS or synchronization line.

Further, the above system may have the following feature: the downlink and uplink zones of the base stations in the same group are determined through negotiation and the negotiation is implemented by the base stations in the same group through a common interface, or achieved through the scheduling of a central control module.

Further, the above system may have the following feature: said same group of base stations comprises two base stations, wherein the uplink multiple access techniques that the first base station and the second base station support are different, while the downlink multiple access techniques that the first base station and the second base station support are same or different.

Further, the above system may have the following feature: the zones divided in a wireless frame are sequentially: the first downlink zone, used for the first base station to send downlink signals; the second downlink zone, used for the second base station to send downlink signals; the first uplink zone, used for the terminal to send uplink signals to the first base station; the second uplink zone, used for the terminal to send uplink signals to the second base station; or The first downlink zone, used for the first base station to send downlink signals; the second downlink zone, used for the second base station to send downlink signals; the first uplink zone, used for the terminal to send uplink signals to the second base station; the second uplink zone, used for the terminal to send uplink signals to the first base station.

It is also provided in present invention a method for supporting different modes of multiple access, comprising the following steps:

(a) operating a group of base stations at the same location, wherein within the same group there are at least two synchronized base stations on the same frequency band supporting different modes of multiple access in uplink or downlink;

(b) Each base station in the same group sending downlink signals in respective downlink zone within the system downlink frame and receiving uplink signals in respective uplink zone within the system uplink frame, wherein the uplink and downlink zones of different base stations are time divided and not overlapped with each other;

(c) Said terminal accessing to one of the base stations according to the downlink multiple access technique that the terminal supports, and receiving/sending signals in the downlink/uplink zone allocated to the base station.

Further, the above method may have the following feature: the base stations in the same group are synchronized through GPS or synchronization line.

Further, the above method may have the following feature: the downlink and uplink zones of the base stations in the same group are determined through negotiation, and the negotiation is implemented by the base stations in the same group through a common interface, or achieved through the scheduling of a central control module.

Further, the above method may have the following feature: said same group of base stations comprises two base stations, wherein the uplink multiple access techniques that the first base station and the second base station support are different, while the downlink multiple access techniques that the first base station and the second base station support are same or different.

Further, the above method may have the following feature: the zones divided in a wireless frame are sequentially: the first downlink zone, used for the first base station to send downlink signals; the second downlink zone, used for the second base station to send downlink signals; the first uplink zone, used for the terminal to send uplink signals to the first base station; the second uplink zone, used for the terminal to send uplink signals to the second base station; or The first downlink zone, used for the first base station to send downlink signals; the second downlink zone, used for the second base station to send downlink signals; the first uplink zone, used for the terminal to send uplink signals to the second base station; the second uplink zone, used for the terminal to send uplink signals to the first base station.

It is also provided in present invention a wireless frame structure supporting different modes of multiple access, comprising uplink frame and downlink frame, wherein, said uplink frame is divided into N uplink multiple access zones according to time division means, and said downlink frame is divided into corresponding N downlink multiple access zones according to time division means, and each uplink multiple access zone and the corresponding downlink multiple access zone are used by the same base station.

Further, the above wireless frame structure may have the following feature: said wireless frame is divided into two uplink multiple access zones and two downlink multiple access zones, and the zones divided in the wireless frame are sequentially: the first downlink zone, used for the first base station to send downlink signals; the second downlink zone, used for the second base station to send downlink signals; the first uplink zone, used for a terminal to send uplink signals to the first base station; the second uplink zone, used for a terminal to send uplink signals to the second base station; or The first downlink zone, used for the first base station to send downlink signals; the second downlink zone, used for the second base station to send downlink signals; the first uplink zone, used for a terminal to send uplink signals to the second base station; the second uplink zone, used for a terminal to send uplink signals to the first base station.

PREFERRED EMBODIMENTS OF THE PRESENT INVENTION

The technical scheme of the present invention will be described in further detail in combination with the accompanying figures and embodiments.

In this embodiment, two or more synchronized base stations with the same location support different modes of multiple access on the same frequency band. That is, a group of base stations are at the same location, and within the same group there are at least two synchronized base stations operating on the same frequency band, supporting different uplink or downlink multiple access modes. Each base station in the same group sends downlink frame in a negotiated downlink zone and receives uplink frame in a negotiated uplink zone, and the zones of the base stations are not overlapped; The terminal accesses to one of the base stations according to the downlink multiple access technique that it supports, and receives/sends signals in the downlink/uplink zone allocated to the base station.

Figure 1:
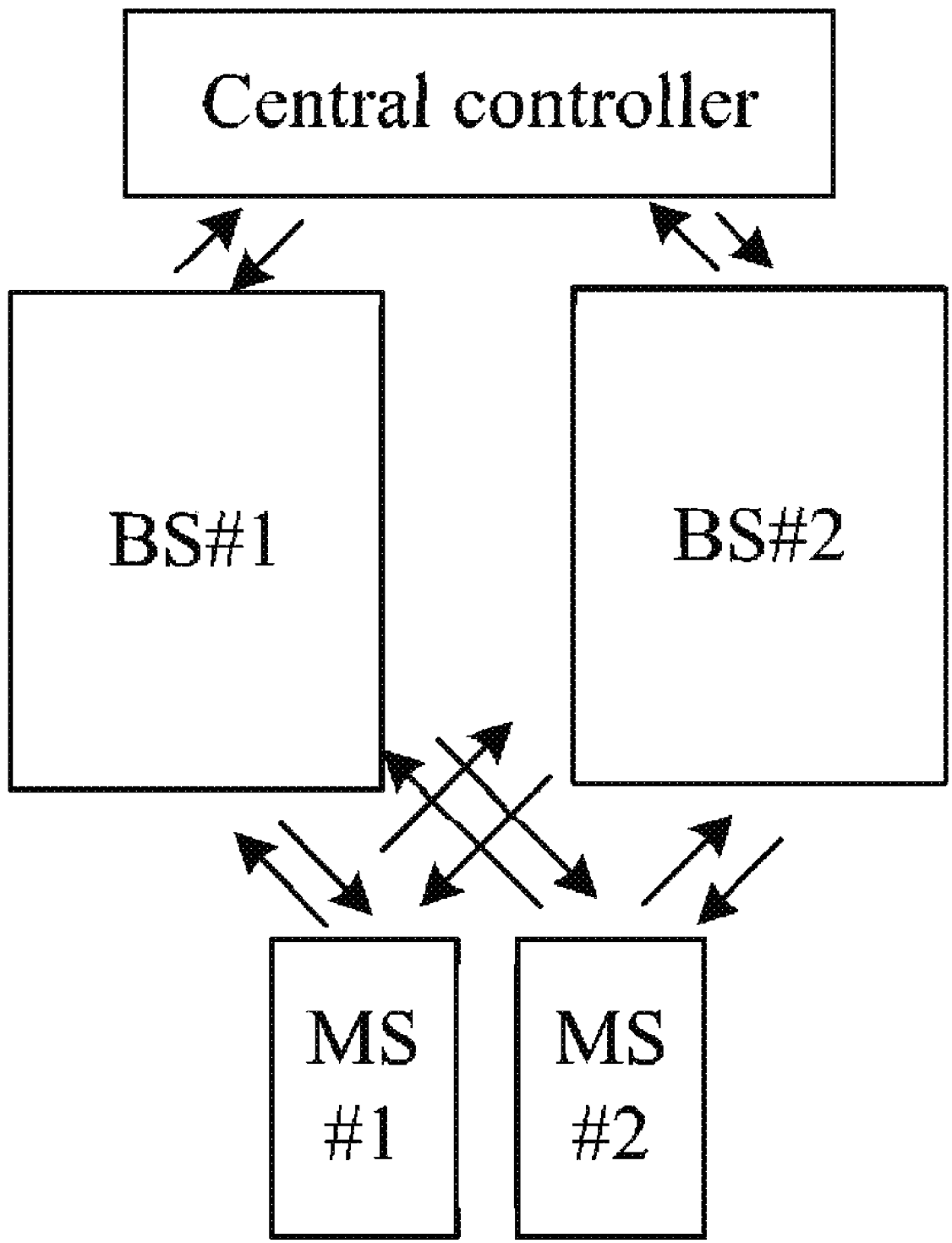
FIG. 1 is a schematic graph of the structure of the system supporting different modes of multiple access to implement an embodiment of the present invention.

As shown in FIG. 1, the system applied in this embodiment comprises a first base station BS#1 and a second base station BS#2. BS#1 and BS#2 support different downlink and uplink multiple access techniques respectively. For example, BS#1 supports downlink OFDMA and uplink OFDMA, while BS#2 supports downlink SC-FDMA and uplink SC-FDMA. But as for the invention, it is not required that the uplink multiple access technique is the same as the downlink one, and as long as the system in whole can support at least two types of uplink multiple access modes or at least two types of downlink multiple access modes, supporting different multiple access modes with the same carrier frequency is achieved.

The system also comprises terminal#1 and terminal#2. Suppose terminal#1 supports downlink OFDMA and uplink OFDMA, while terminal#2 supports downlink SC-FDMA and uplink SC-FDMA.

Figure 2:
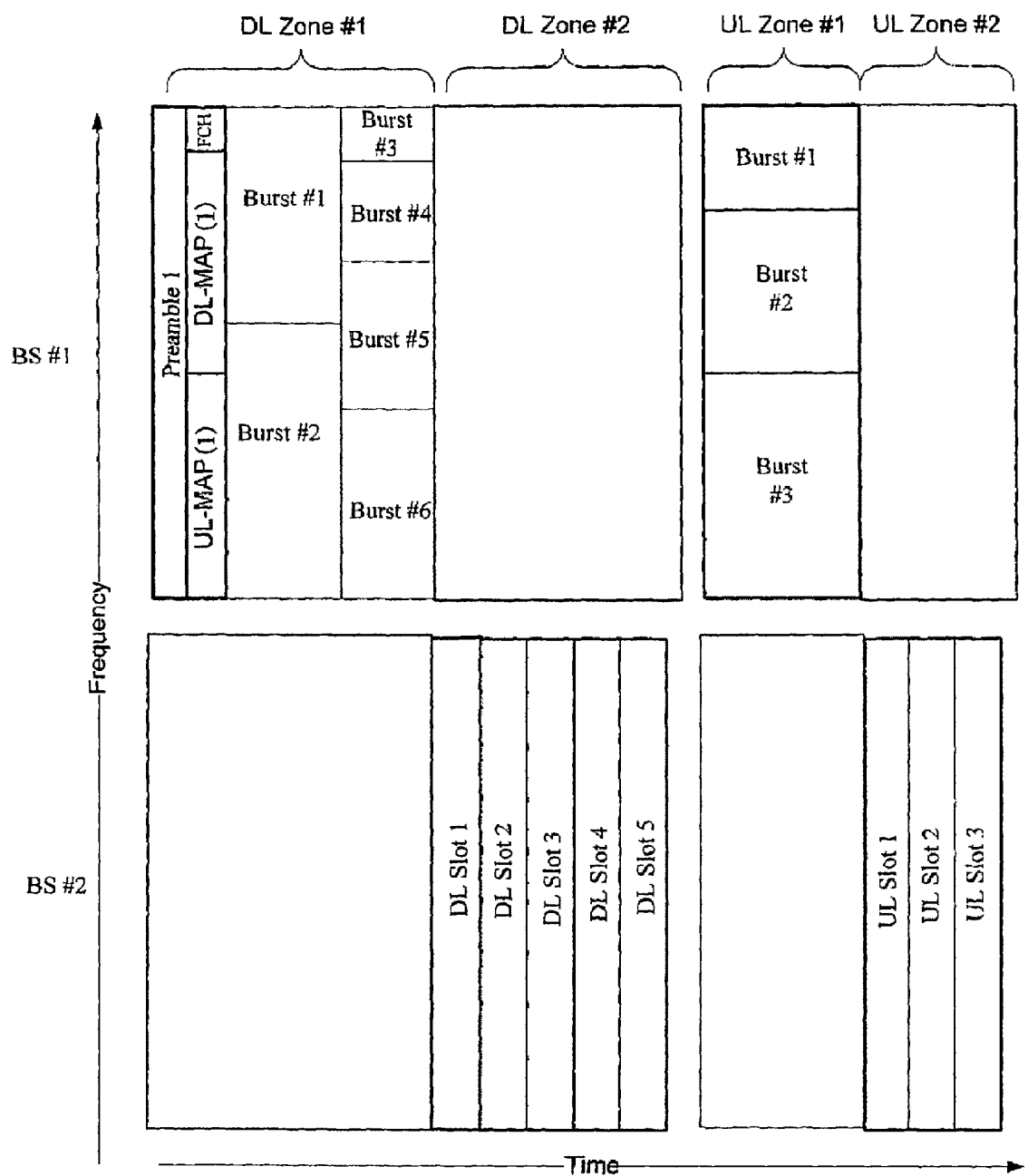
FIG. 2 is a schematic graph of the wireless frame structure of the system applied to implement an embodiment of the present invention.

The frame structure applied in this embodiment is depicted in FIG. 2, which comprises downlink frame and uplink frame. The downlink frame and uplink frame are respectively divided into two downlink multiple access zones (DL Zone) and two uplink multiple access zones (UL Zone) according to time division means, in which each downlink multiple access zone supports a type of downlink multiple access technique, and each uplink multiple access zone supports a type of uplink multiple access technique. The relative position of each downlink multiple access zone in the downlink frame is variable, and so is the relative position of each uplink multiple access zone in the uplink frame.

In this embodiment, the zones within a period negotiated by BS#1 and BS#2 with the same frequency band are sequentially: the first downlink zone (DL Zone #1), used for BS#1 to send downlink frames; the second downlink zone (DL Zone #2), used for BS#2 to send downlink frames; the first uplink zone (UL Zone #1), used for the terminal to send uplink frames to BS#1; the second uplink zone (UL Zone #2), used for the terminal to send uplink frames to BS#2. Downlink multiple access zone #1 and downlink multiple access zone #2 support OFDMA and SC-FDMA respectively, while uplink multiple access zone #1 and uplink multiple access zone #2 support OFDMA and SC-FDMA respectively.

Firslty, BS#1 and BS#2 are synchronized, wherein the synchronization means for BS#1 and BS#2 may be GPS synchronization or synchronization line. Then BS#1 and BS#2 send/receive signals in the negotiated downlink/uplink zones respectively. That is, BS#1 first sends downlink signals in downlink multiple access zone #1, and when completed, BS#2 sends downlink signals in downlink multiple access zone #2, and then BS#1 and BS#2 do not send signals in a guard interval, and after this, BS#1 receives uplink signals in uplink multiple access zone #1, and when completed, BS#2 receives uplink signals in uplink multiple access zone #2, and until now, the process of receiving/sending signals is finished. Wherein, the downlink zones or/and uplink zones of BS#1 and BS#2 may be adjacent or have intervals between them.

In this embodiment, length of the uplink frame and downlink frame in the system wireless frame are adjustable, and so are the zones in the uplink frame and downlink frame used by the two base stations. Of course, it should be guaranteed that the zones are not overlapped with each other. The configuration of downlink frame and uplink frame, and the configuration of downlink zones and uplink zones may be negotiated between BS#1 and BS#2 through a common interface, or may be centrally scheduled by a central controller. For the present invention, however, they may be fixed according to a protocol configuration, or may not be real-time changed.

In this embodiment, for a single base station, either of the methods for sending and receiving signals is not different from that of a common base station whose uplink and downlink support only one multiple access mode, while just the time length of downlink sending and uplink receiving are shortened, since the time of the uplink frame and downlink frame are shared by the two base stations. But the processing at the terminal side need not to be changed.

The process of sending and receiving will be described in detail as the following.

As shown in FIG. 2, BS#1 supporting a first multiple access mode of OFDMA sends a preamble at the beginning of the first multiple access zone of the downlink frame, and then sends downlink control information and data to the terminal supporting the first multiple access mode; while BS#2 supporting a second multiple access mode of SC-FDMA sends control information and data to the terminal supporting the second multiple access mode in the time slot of the second multiple access zone of the downlink frame.

As shown in FIG. 2, in the downlink multiple access zone #1 supporting OFDMA, BS#1 sends the information of position and resource allocation of downlink multiple access zone #1 and uplink multiple access zone #1 to the terminal through downlink control messages and uplink control messages, respectively. Wherein, the downlink control messages comprise FCH (Frame Control Head) and DL-MAP (downlink map) messages, and may also comprise DCD (downlink channel description) massage; while the uplink control messages comprise UL-MAP message, and may also comprise UCD (uplink channel description) message, or other broadcast control messages (DCD and UCD are not shown in FIG. 2).

The resource allocation information of the downlink multiple access zone in DL-MAP comprises one or a combination of the following: positions of all the bursts in the downlink multiple access zone, target terminals of the bursts, size of the bursts, modulation encoding modes applied in transmission, and so on. For example, it may be indicated in the downlink control message that Burst#1 is allocated to terminal#1, and other bursts are also indicated to other terminals of the system, and there may further be more such bursts. The uplink control message comprises UL-MAP (uplink map) message, of which the position information of the uplink multiple access zone indicates the position and/or size (optional) of this uplink multiple access zone in the uplink frame. The resource allocation information of the uplink multiple access zone comprises one or a combination of the following: positions of all the bursts in the uplink multiple access zone, which terminals they are allocated to, size of the bursts, modulation encoding modes applied. For example, the uplink control message may indicate that an uplink burst is used for the uplink transmission by terminal#1. UL-MAP may further comprise the allocation information of initial access zone. Moreover, when the position and/or size of uplink multiple access zone #1 need to be changed, the base station sends the position changing information in the uplink control message of the downlink multiple access zone #1.

As shown in FIG. 2, BS#2 sends downlink control message and uplink control message in downlink slot (DL Slot) in downlink multiple access zone #2 supporting SC-FDMA, to send the information of position and resource allocation of downlink multiple access zone #2 and uplink multiple access zone #2. Said resource allocation information of the uplink multiple access zone comprises the allocation information of bursts or slots in the uplink multiple access zone, which comprises one or a combination of the following parameters: position of each burst or slot, the target address of the uplink burst or slot (indicating the terminal that performs uplink transmission in this burst/slot), size of the burst or slot, type of the burst or slot (indicating what kind of data are transmitted in the burst or slot), modulation encoding modes applied in transmission, and so on. For example, the uplink control message may indicate that an uplink slot (UL Slot) in uplink multiple access zone #2 is used by terminal#2 for uplink transmission. The positions of the initial access channel and data channel may be allocated in the uplink control message of downlink multiple access zone #2 to support the initial network access of the terminal supporting this uplink multiple access technique. The uplink control message of downlink multiple access zone #2 may also comprise the information of the changing of the multiple access zone's position, such as a new position of uplink multiple access zone #2.

In the uplink frame, the terminal supporting the first multiple access mode and the terminal supporting the second multiple access mode send data to BS#1 and BS#2 in uplink multiple access zone #1 and uplink multiple access zone #2 respectively according to the received control information.

Processing at the terminal side is exactly the same as that of a terminal supporting SC-FDMA or OFDMA in the prior art, thus the description is omitted here.

The description above is just a preferred embodiment of the present invention, and is not to restrict the present invention. For those skilled in the art, the present invention may have all kinds of modifications and variations. Without departing from the spirit and essence of the present invention, any kind of modification, equivalent substitution, or improvement should fall into the scope of the claims of the present invention.

For instance, as for the division of zones in FIG. 2, uplink multiple access zone #2 used by BS#2 can be arranged in front of uplink multiple access zone #1 used by BS#1 in the uplink frame.

INDUSTRIAL APPLICABILITY

The present invention can be applied in the field of wireless communication to support different multiple access modes with the same carrier frequency.

What we claim is:

1. A system for supporting different modes of multiple access, comprising base stations and terminals, wherein a group of base stations are located at the same location, and within the same group there are at least two synchronized base stations operating on a same frequency band and one of two synchronized base stations supports a different mode of multiple access from the other in uplink or downlink, and wherein, the base stations in the same group are configured to send downlink signals in their respective downlink zone within a system downlink frame and receive uplink signals in their respective uplink zone within a system uplink frame, the uplink and downlink zones of different base stations are time divided and not overlapped with each other;

each terminal is configured to access to one of the base stations according to the downlink multiple access technique that the terminal supports, receive signals in the downlink zone allocated to the base station, and send signals in the uplink zone allocated to the base station;

wherein the group of base stations comprises a first base station and a second base station, the system downlink frame comprises a first downlink zone and a second downlink zone, the system uplink frame comprises a first uplink zone and a second uplink zone; and the first downlink zone is allocated to the first base station and the second downlink zone is allocated to the second base station for sending downlink signals; the first uplink zone is allocated to the first base station and the second uplink zone is allocated to the second base station for receiving uplink signals; and wherein the uplink multiple access technique that the first base station supports is different from those that the second base station supports.

2. A system of claim 1, wherein the base stations in the same group are synchronized through GPS or synchronization line.

3. A system of claim 1, wherein the downlink and uplink zones of the base stations in the same group are determined through negotiation, and the negotiation is implemented by the base stations in the same group through a common interface, or achieved through the scheduling of a central controller.

4. A method for supporting different modes of multiple access, comprising the following steps:

(a) operating a group of base stations at the same location, wherein within the same group there are at least two synchronized base stations on a same frequency band and one of two synchronized base stations supports a different mode of multiple access from the other in uplink or downlink;

(b) the base stations in the same group sending downlink signals in their respective downlink zone within a system downlink frame and receiving uplink signals in their respective uplink zone within a system uplink frame, wherein the uplink and downlink zones of different base stations are time divided and not overlapped with each other;

(c) a terminal accessing to one of the base stations according to the downlink multiple access technique that the terminal supports, receiving signals in the downlink zone allocated to the base station, and sending signals in the uplink zone allocated to the base station;

wherein the group of base stations comprises a first base station and a second base station, the system downlink frame comprises a first downlink zone and a second downlink zone, the system uplink frame comprises a first uplink zone and a second uplink zone;

the first downlink zone is allocated to the first base station and the second downlink zone is allocated to the second base station for sending downlink signals; the first uplink zone is allocated to the first base station and the second uplink zone is allocated to the second base station for receiving uplink signals; and wherein the uplink multiple access technique that the first base station supports is different from those that the second base station supports.

5. A method of claim 4, wherein the base stations in the same group are synchronized through GPS or synchronization line.

6. A method of claim 4, wherein the downlink and uplink zones of the base stations in the same group are determined through negotiation, and the negotiation is implemented by the base stations in the same group through a common interface, or achieved through the scheduling of a central controller.

7. A central controller for configuring a wireless frame structure supporting different modes of multiple access, comprising a central control module for centrally scheduling receiving and sending actions of a group of base stations located at the same location;

wherein the wireless frame including an uplink frame and downlink frame, said uplink frame comprising N, where N is an integer, uplink multiple access zones according to time division means, and said downlink frame comprising N downlink multiple access zones corresponding to the N uplink multiple access zones according to time division means, and wherein the N uplink multiple access zones and N downlink multiple access zones are allocated to the group of base stations, wherein one uplink multiple access zone and the corresponding downlink multiple access zone are allocated to one base station;

wherein the group of base stations comprises a first base station and a second base station, the N downlink multiple access zones comprises a first downlink zone and a second downlink zone, the N uplink multiple access zones comprises a first uplink zone and a second uplink zone; and the zones are sequentially: the first downlink zone is allocated to the first base station and the second downlink zone is allocated to the second base station for sending downlink signals; the first uplink zone is allocated to the first base station and the second uplink zone is allocated to the second base station for receiving uplink signals;

wherein a first uplink multiple access technique that the first base station supports is different from a second uplink multiple access technique that the second base station supports.

* * * * *